Figure 1:
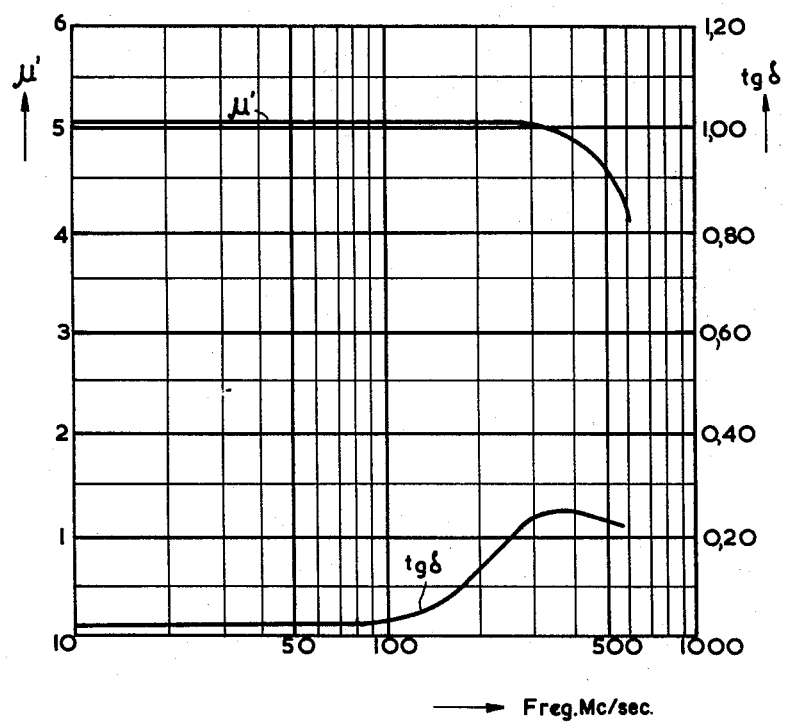
Figure 2:
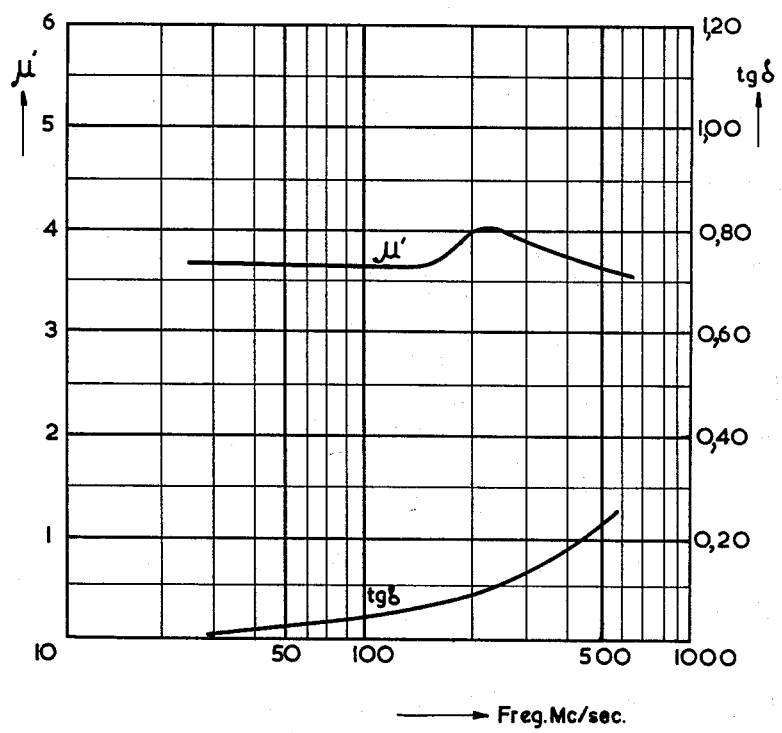
Figure 3:
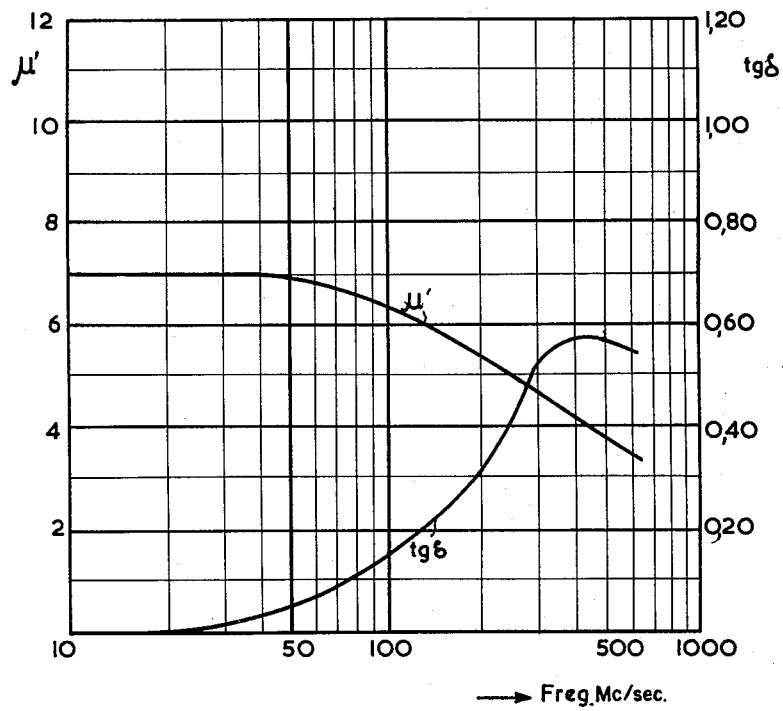
Figure 4:
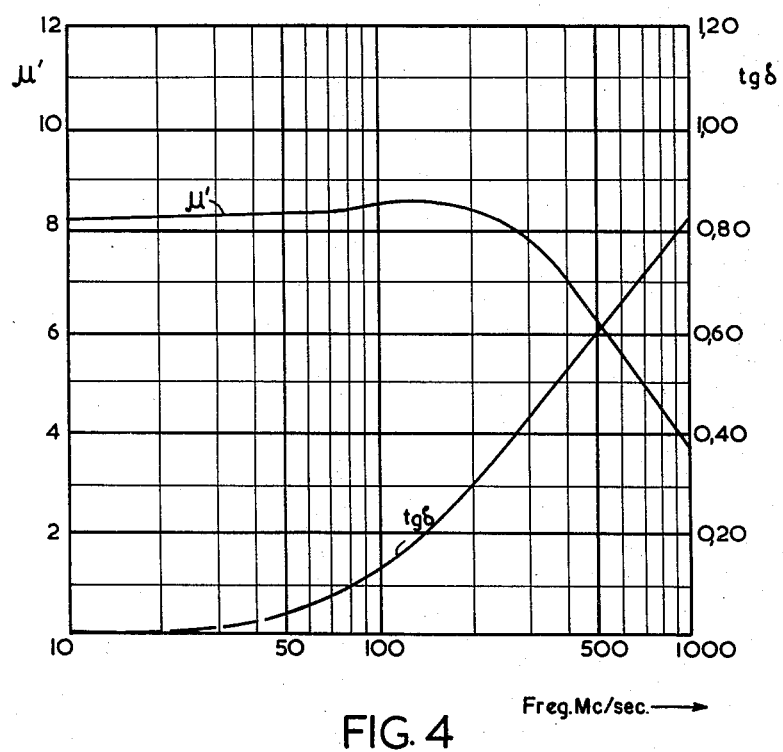
Figure 5:
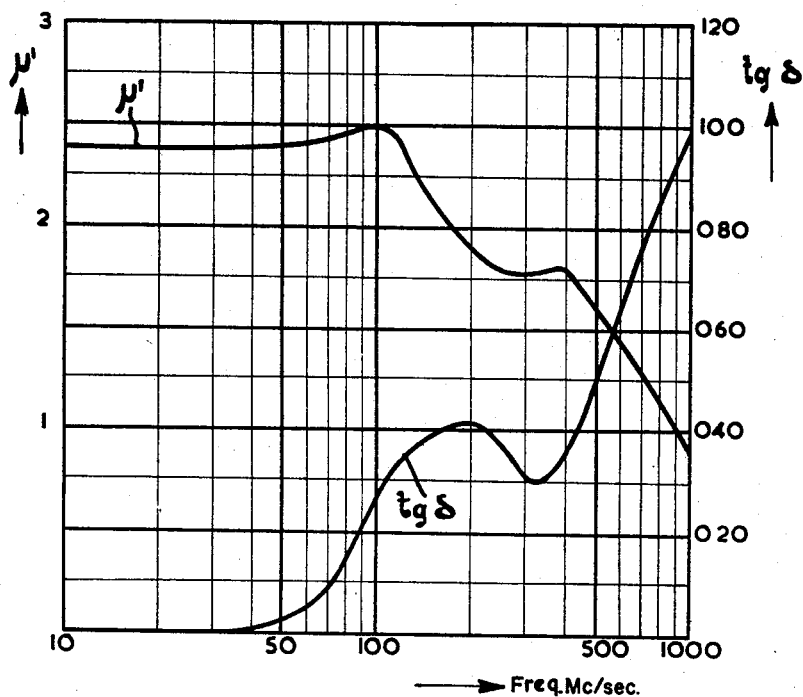

though-2,955,085
Patented Oct. 4, 1960

2,955,085
FERRITES OF DECREASED INITIAL PERMEABILITY AT HIGH FREQUENCIES

Gerard Heinrich Jonker, Henricus Petrus Johannes Wijn, and Poul Bernard Braun, all of Eindhoven, Netherlands, assignors, by mesne assignments, to North American Philips Company, Inc., New York, N.Y., a corporation of Delaware Filed Aug. 9, 1956, Ser. No. 603,134

Claims priority, application Netherlands Aug. 10, 1955

10 Claims. (Cl. 252—62.5)

Our invention relates to oxidic ferromagnetic materials, to methods of preparing these materials and to bodies made from these materials.

Oxidic ferromagnetic materials which exhibit high values of initial permeability are known in the art. All these materials show a decrease of the initial permeability in a certain frequency range the position of which in the frequency scale is related to the low-frequency value of the initial permeability. The initial permeability decreases in a frequency range the position of which in the frequency scale is higher in proportion as the value of the initial permeability at low-frequency is lower. Thus the cores formed from these materials are not too satisfactory for use at high frequencies.

The principal object of our invention, therefore, is to provide a new and novel class of oxidic ferromagnetic materials the initial permeability of which decreases in a much higher positioned frequency range than in the known materials with an equal low-frequency value of the initial permeability.

Another object of our invention is to provide oxidic ferromagnetic materials which have initial permeabilities of more and often materially more than 2 at frequencies of about 50 mc./s. and often considerably higher frequencies and which exhibit low losses.

Still another object of our invention is to provide oxidic ferromagnetic materials which may serve as materials for magnetic bodies e.g. cores at frequencies of about 50 mc./s. and often considerably higher frequencies.

These and other objects of our invention will be apparent as the specification progresses.

According to our invention we have found new and novel materials having a composition $$Q_{(1-x)}Ca_xFe^{II}_{2(1-y)}R_{2y}Fe^{III}_{16(1-z)}T_{16z}O_{27}$$

wherein Q is at least one divalent metal selected from the group consisting of Ba, Sr and Pb, R is at least one divalent metal or complex selected from the group consisting of Mn, Co, Ni, Zn, Mg and $$\frac{Li^I + Fe^{III}}{2}$$

T is at least one trivalent metal selected from the group consisting of Al and Cr, $$0 \leq x \leq \frac{2}{5}, \frac{1}{4} \leq y \leq 1 \text{ and } 0 \leq z \leq \frac{1}{5}$$

All these materials have initial permeabilities which do not decrease substantially up to very high frequencies. They have initial permeabilities of more and often materially more than 2 at frequencies of about 50 mc./s. and often considerably higher frequencies. Since they are basically oxidic in nature they are characterized by high ohmic resistances so that eddy current losses are negligibly small. In addition to having greatly improved initial permeabilities at high frequencies, particularly above 50 mc./s., the materials of our invention exhibit relatively low residual loss factors (tan δ) at frequencies above 50 mc./s.

The novel materials of our invention have a crystal structure which is isomorphic with the material $$BaFe^{II}_2Fe^{III}_{16}O_{27}$$

having a unit cell which in the hexagonal crystal system has a c-axis of about 32.8 A. and an a-axis of about 5.9 A., a material known to have permanent magnetic properties but wholly unsuitable as a core material, particularly at frequencies exceeding 50 mc./s. where its initial permeability is less than 2.

While the entire class of our novel materials have improved magnetic properties, particularly in regard to their initial permeabilities, we have found that materials in which Q is at least one divalent metal selected from the group consisting of Ba and Sr, R is at least one divalent metal or complex selected from the group consisting of Mn, Co, Ni, Zn, Mg and $$\frac{Li^I + Fe^{III}}{2}, x=0, \frac{1}{4} \leq y \leq 1 \text{ and } z=0$$

have more improved initial permeabilities.

We have found that materials having even further improved initial permeabilities are obtained if divalent Co is at least a portion of the metals represented by the term R in the formula representing the chemical composition of our materials described in the last paragraph.

We have further found that even better results are obtained if the compounds have a composition $$QFe^{II}_{2(1-y-p)}Co_{2p}R_{2y}Fe^{III}_{16}O_{27}$$

wherein Q is at least one divalent metal selected from the group consisting of Ba and Sr, R is at least one divalent metal or complex selected from the group consisting of Mn, Ni, Zn, Mg and $$\frac{Li^I + Fe^{III}}{2} \quad \frac{1}{3} \leq p \leq \frac{2}{3}, \ 0 \leq y \leq \frac{2}{3} \text{ and } p+y \leq 1$$

and more particularly if the metal represented by R is divalent Zn.

We prepare the novel materials of our invention by heating at a temperature of more than 1100° C. a finely divided mixture of metallic oxides in a ratio approximately corresponding to that of the metals in the materials of our invention. Alternatively instead of a metallic oxide we may use a material which forms an oxide when heated. As these oxide-forming materials we may use carbonates, oxalates and acetates of the metals. Moreover, instead of metallic oxides we may use one or more preformed reaction products of at least two of the metallic oxides.

Preferably we prepare the novel materials of our invention by heating at a temperature of between 1150° and 1350° C. a finely divided mixture of metallic oxides and/or oxide-forming materials and/or reaction products of metallic oxides, in a ratio approximately corresponding to that of the metals in the materials of our invention.

If necessary, the mixture of oxides and/or equivalent materials may be presintered, usually at a relatively low temperature of about 900° C. to about 1200° C., the presintered material being reground and resintered several more times if desired before being subjected to the higher temperature of the process.

If we prepare the novel materials of our invention by heating a finely divided mixture of metallic oxides and/or oxide-forming materials, we preferably heat the starting mixture rapidly from room temperature to a temperature of more than 1250° C. in order to ensure a maximum conversion into the desired compounds. At lower temperatures also compounds having a magneto-plumbite structure (for example $BaFe_{12}^{III}O_{19}$)

and compounds having a spinel structure (for example $CoFe_2^{III}O_4$)

are formed in addition to the desired compounds, the former compounds not having the desired properties and being convertible only with difficulty into the desired compounds. If presintering is performed, it is not necessary to heat the presintered material rapidly to a temperature of more than 1250° C. during the subsequent sintering operations.

While we may heat the starting mixtures of these oxides and/or oxide-forming materials to any temperature above 1250° C. we have found that best results are obtained by heating the starting mixtures to a temperature between about 1300° C. and 1370° C.

In any event the rate of heating should be rapid and preferably the maximum temperature should be reached in 30 minutes.

If the starting mixture contains one or more preformed reaction products of at least two of the metallic oxides, it is not necessary to heat the starting mixture rapidly to a temperature of more than 1250° C. We then use as a preformed reaction product of at least two of the metallic oxides preferably an iron-containing reaction product, which has been produced at low temperature, preferably below 1100° C., and which has a crystal structure corresponding with that of the mineral magnetoplumbite, for example $Ba_xSr_{(1-x)}Fe_{12}O_{19}$, wherein $0 \leq x \leq 1$.

It has been found that, if the sintering operation is carried out in an atmosphere rich in oxygen, compounds of the desired crystal structure are obtained, it is true, but that often the ferrous content is lower and the ferric content is higher than the values corresponding with the formulae as herein given. Consequently, it appears to be possible to replace in the formula of our novel materials part of all of the $Fe^{II}$-ions by $Fe^{III}$-ions. In this case the specific resistance is found to be much higher than that of preparations having the ferrous content in accordance with the formulae herein given.

In order to facilitate the sintering operation of our process we may include various flux agents, for example silicates such as pentonite or fluorides such as calcium fluoride in an amount of from 0.25% to 5% in the mixture of the oxides.

Bodies of desired shape may be formed by sintering the starting mixture directly in the desired shape. Alternatively a product of the desired shape may be formed by regrinding the sintered material of our invention or the presintered material, moulding the resultant powder into the desired shape, and by sintering the moulded product if necessary. A binder such as water, a solution of nitrocellulose or a solution of carboxymethylcellulose may be added to the moulding mixture if necessary.

In a further embodiment of our invention the finely divided material of our invention is moulded to form a body of the desired shape by pressing the relative material together with a binding agent which is capable of being hardened (for example a polyester resin or an ethoxylin resin), followed by hardening the moulded body.

Our invention will now be described in greater detail with reference to the following examples and drawing.

In the drawing Figs. 1 to 5 are graphs showing the relationship between the values of the real portion of initial permeability, $\mu'$, and the values of the loss factor $\tan \delta$ to frequency for various embodiments of our invention.

The relationship between the loss factor $\tan \delta$ and the real portion of initial permeability, $\mu'$, will be apparent from the following explanation which forms no part of our invention and which is not to be used in any way to limit the scope of our invention:

The term $\mu'$ as used herein may be explained as follows: A sinusoidally alternating magnetic field with small amplitude will produce a similarly varying inductance in a ferromagnetic body but due to ferromagnetic losses there will be a phase difference between the magnetic field and the inductance. Thus the permeability of the ferromagnetic body, $\mu$, may be represented by a complex magnitude $\mu = \mu' - j\mu''$. The real portion of permeability, $\mu'$, is in phase with the field applied while the other lags in phase by 90° with respect to the applied field. The loss factor "$\tan \delta$" can then be defined as $$\tan \delta = \frac{\mu''}{\mu'}$$

EXAMPLE I

A mixture of 20.0 gs. of $BaCO_3$, 136.0 gs. of $Fe_2O_3$ and 8.2 gs. of ZnO was ground with ethyl alcohol in a porcelain ball mill for half an hour. Subsequent to drying the oxide mixture and mixing it with a small quantity of a solution of carboxymethylcellulose as an organic binder, rings were moulded at a pressure of 1000 kgs./cm.² These rings had an outer diameter of about 35 mms., an inner diameter of about 25 mms. and a height of about 4 mms. These rings were then passed into a furnace at such a rate that within half an hour the hot zone of the furnace which had a temperature of 1320° C. was reached. The rings were kept at this temperature for about one hour and then cooled in the furnace slowly, i.e. within about three hours, to room temperature. During this treatment a flow of air was passed through the furnace. The rings thus fired consisted, as was proved by an X-ray examination, almost entirely of crystals with the crystal structure isomorphic to that of $BaFe_2^{II}Fe_{16}^{III}O_{27}$ The properties of these rings are indicated in the table under No. 1.

EXAMPLE II

A mixture of 20.0 gs. of $BaCO_3$, 136.0 gs. of $Fe_2O_3$ and 11.9 gs. of $CoCO_3$ was ground with ethyl alcohol in a porcelain ball mill for half an hour. The dried oxide mixture was then heated in air from room temperature to 1300° C. within a period of 20 minutes. This temperature was maintained for about one hour, after which, this product was cooled to room temperature within a few hours. This reaction product was then reground for about one hour. To this dried ground powder a small supply of a solution of nitrocellulose as an organic binder was added. Then this mixture was moulded at a pressure of 1000 kgs./cm.² into rings having an outer diameter of about 35 mms., an inner diameter of about 25 mms. and a height of 3 to 4 mms. These rings were heated within a period of one hour from room temperature to 1340° C., then kept at this temperature for one hour and then cooled to room temperature within three hours. Throughout the heating period a stream of air was kept flowing through the furnace. X-ray examination showed that the material produced consisted almost entirely of crystals with the crystal structure isomorphic to that of $$BaFe_2^{II}Fe_{16}^{III}O_{27}$$

The properties of these rings are indicated in the table under No. 2 and by the graph of Fig. 1.

EXAMPLE III

A mixture of 14.8 gs. of $SrCO_3$, 136.0 gs. of $Fe_2O_3$ and 11.9 gs. of $CoCO_3$ was ground with ethyl alcohol in a porcelain ball mill for half an hour. Rings were moulded from the dried product at a pressure of 1000 kgs./cm.² and fired in the same manner as described in Example I. X-ray examination proved that the material obtained consisted mainly of crystals with the crystal structure isomorphic to that of $$BaFe_2^{II}Fe_{16}^{III}O_{27}$$

and for a small part of crystals with spinel structure. The properties of this material are indicated in the table under No. 3 and by the graph of Fig. 2.

EXAMPLE IV

A mixture of 20.0 gs. of $BaCO_3$, 136.0 gs. of $Fe_2O_3$, 4.1 gs. of ZnO and 3.8 gs. of CoO was ground with ethyl alcohol in a porcelain mill for half an hour. Rings were moulded from the dried powder at a pressure of 1000 kgs./cm.² and fired in the manner described in Example I. The properties of the fired rings are indicated in the table under No. 4 and also by the graph of Fig. 3.

EXAMPLE V

To the mixture of Example I 3 gs. of LiF was added. Rings were moulded from this mixture at a pressure of 1000 kgs./cm.² and fired in the same manner as described in Example I. The properties of these sintered rings are indicated in the table under No. 5.

In the manner described in Example I many other similar compounds have been produced. The properties of a series of compounds, which are important in the present respects, are indicated in the table under Nos. 6 to 13.

EXAMPLE VI

From $BaCO_3$ and $Fe_2O_3$, in the molecular ratio of 1:5.6 by heating the mixture for 15 hours at 900° C., a material was produced, which consisted primarily of the compound $BaFe_{12}O_{19}$. Of this product was produced, together with ZnO, $CoCO_3$ and $Fe_2O_3$, a mixture in a ratio of 1 mol $BaFe_{12}O_{19}$, 0.75 mol $CoCO_3$, 0.75 mol ZnO and 2.25 mols $Fe_2O_3$, which corresponds to the desired compound $$BaCo_{0.75}Zn_{0.75}Fe_{0.50}^{II}Fe_{16}^{III}O_{27}$$

The mixture was ground for four hours with alcohol in a vibration mill and then presintered for two hours at 1100° C. in oxygen, after which it was ground for one hour with alcohol in a ball mill. Rings were moulded from the product obtained at a pressure of 1000 kgs./cm.². One ring was fired for one hour at 1250° C. in oxygen. The properties of this ring are indicated in the table under No. 14. A further moulded ring was fired for one hour at 1250° C. in air. The properties of this ring are indicated in the table under No. 15. X-ray examination proved that the material of the two rings consisted primarily of crystals having the structure isomorphic to that of $$BaFe_2^{II}Fe_{16}^{III}O_{27}$$

EXAMPLE VII

A mixture of 7.9 gs. of $BaCO_3$, 3.81 gs. of $CoCO_3$, 3.92 gs. of ZnO and 51.2 gs. $Fe_2O_3$ was ground with ethyl alcohol in a porcelain ball mill for half an hour. The dried oxide mixture was then heated in $O_2$ from room temperature to 1300° C. within a period of 20 minutes. This temperature was maintained for about one hour, after which this product was cooled to room temperature within a few hours and then ground again with ethyl alcohol in a vibration mill for 4 hours. Rings were moulded from the dried powder at a pressure of 1000 kgs./cm.². These rings were heated in $O_2$ at 1300° C. for 1 hour and then cooled in the furnace slowly, i.e. within about 4 hours, to room temperature. During this treatment a flow of $O_2$ was passed through the furnace. The rings thus produced consisted, as was proved by an X-ray examination, entirely of crystals with the crystal structure isomorphic to that of $$BaFe_2^{II}Fe_{16}^{III}O_{27}$$

The properties of these rings are indicated in the table under No. 16.

In the table the properties which are important in respect to the invention are indicated for a series of compounds of the invention. For the sake of comparison, the table indicates the properties of a $$BaFe_2^{II}Fe_{16}^{III}O_{27}$$

preparation. In column 2 of the table under the heading of "Main Constituent" chemical formulae are indicated, which were derived from the composition of the starting mixture and from the fact proved by the X-ray examination that the crystal structure of the compounds concerned is isomorphic to that of the compound $$BaFe_2^{II}Fe_{16}^{III}O_{27}$$

All measured results were obtained by measurements carried out on rings in the demagnetized state at room temperature, the measurements being carried out by the method described by C. M. van der Burgt, M. Gevers and H. P. J. Wijn in "Phillips Technical Review," 14, 245 (1952-1953).

The properties of the preparations Nos. 2, 3, 4, 6 and 7 are shown more extensively in the graphs of Figs. 1 to 5 respectively.

These graphs show relationship between the values of the real portion of the initial permeability, $\mu'$, and the values of tan $\delta$ to frequency. In these graphs the values of $\mu'$ and tan $\delta$ are plotted along the ordinates and the frequencies are plotted along the abscissa.

Table

| No. | Main Constituent | Production Sintering temp., °C. | Production gas atm. | $d$ g./cm.$^3$ | $\rho$ Ω cm. | $\mu'$ 10 kc./s. | $\mu'$ 50 mc./s. | $\mu'$ 500 mc./s. | Fig. |
|---|---|---|---|---|---|---|---|---|---|
|  | $BaFe_2^{II}Fe_{16}^{III}O_{27}$ | 1,330 | $N_2 + 1\%O_2$ |  |  | 2 | <2 | <2 |  |
| 1 | $BaZnFe^{II}Fe_{16}^{III}O_{27}$ | 1,320 | air |  |  | 3.5 | 3.0 | 1.5 |  |
| 2 | $BaCoFe^{II}Fe_{16}^{III}O_{27}$ | 1,340 | air |  |  | 5.0 | 5.1 | 4.7 | 1 |
| 3 | $SrCoFe^{II}Fe_{16}^{III}O_{27}$ | 1,320 | air | 4.1 |  | 3.7 | 3.7 | 3.6 | 2 |
| 4 | $BaCo_{0.5}Zn_{0.5}Fe^{II}Fe_{16}^{III}O_{27}$ | 1,320 | air |  |  | 7 | 7 | 4 | 3 |
| 5 | $Ba(Zn,Li,Fe)_2Fe_{16}^{III}O_{27}$ | 1,320 | air | 4.2 | $10^4$ | 4 | 3.5 | 1.5 |  |
| 6 | $BaCo_{0.75}Zn_{0.25}Fe^{II}Fe_{16}^{III}O_{27}$ | 1,320 | air | 3.6 | $10^7$ | 8.5 | 8.3 | 6.1 | 4 |
| 7 | $BaNiFe^{II}Fe_{16}^{III}O_{27}$ | 1,320 | air |  |  | 2.4 | 2.4 | 1.7 | 5 |
| 8 | $BaCo_{0.75}Zn_{0.75}Fe_{0.50}^{II}Fe_{16}^{III}O_{27}$ | 1,320 | $O_2$ | 3.7 | $10^7$ | 8.5 | 8.2 | 4.8 |  |
| 9 | $BaCo_{0.75}Ni_{0.25}Fe^{II}Fe_{16}^{III}O_{27}$ | 1,360 | air | 4.4 | $10^5$ | 5.6 | 5.5 | 3.7 |  |
| 10 | $BaCoMn_{0.5}Fe_{0.5}^{II}Fe_{16}^{III}O_{27}$ | 1,320 | $O_2$ | 3.2 | $10^7$ | 3.2 | 3.2 | 2.8 |  |
| 11 | $BaZnFe^{II}Fe_{14}^{III}Cr_2O_{27}$ | 1,360 | $O_2$ |  |  | 2.2 | 2.1 | 1.1 |  |
| 12 | $BaZnFe^{II}Fe_{15}^{III}AlO_{27}$ | 1,360 | $O_2$ |  |  | 2.6 | 2.5 | 1.5 |  |
| 13 | $Ba_{0.5}Sr_{0.5}Co_{0.75}Zn_{0.25}Fe^{II}Fe_{16}^{III}O_{27}$ | 1,320 | $O_2$ |  |  | 6.5 | 6.5 | 4.2 |  |
| 14 | $BaCo_{0.75}Zn_{0.75}Fe_{0.5}^{II}Fe_{15}^{III}O_{27}$ | 1,250 | $O_2$ |  | $5.10^7$ | 9.2 | 9.3 | 5.6 |  |
| 15 | $BaCo_{0.75}Zn_{0.75}Fe_{0.5}^{II}Fe_{15}^{III}O_{27}$ | 1,250 | air |  | $5.10^3$ | 15.2 | 11.1 | 6.6 |  |
| 16 | $BaCo_{0.3}Zn_{1.2}Fe^{II}Fe_{16}^{III}O_{27}$ | 1,300 | $O_2$ |  |  | 7.7 | 7.6 | 4.7 |  |

While we have described our invention in connection with specific embodiments and applications, other modifications thereof will be readily apparent to those skilled in this art without departing from the spirit and scope of the invention as defined in the appended claims.

What we claim is:

1. A ferromagnetic material consisting essentially of crystals having a composition $$Q_{(1-x)}Ca_xFe^{II}_{2(1-y)}R_{2y}Fe^{III}_{16(1-z)}T_{16z}O_{27}$$

wherein Q is at least one divalent metal ion selected from the group consisting of Ba, Sr and Pb, R is at least one divalent metal ion selected from the group consisting of Mn, Co, Ni, Zn, Mg and the complex $$\frac{Li^I + Fe^{III}}{2}$$

T is at least one trivalent metal ion selected from the group consisting of Al and Cr, and wherein $x$ is not greater than ⅔, $y$ is between ¼ and 1, and $z$ is not greater than ⅕ these crystals having a unit cell which in the hexagonal crystal system has a $c$-axis of about 32.8 A. and an $a$-axis of about 5.9 A.

2. A ferromagnetic body having an initial permeability exceeding 2 at a frequency of at least 50 mc./sec. consisting essentially of a highly-coherent mass of crystals having a composition $$Q_{(1-x)}Ca_xFe^{II}_{2(1-y)}R_{2y}Fe^{III}_{16(1-z)}T_{16z}O_{27}$$

wherein Q is at least one divalent metal ion selected from the group consisting of Ba, Sr and Pb, R is at least one divalent metal ion selected from the group consisting of Mn, Co, Ni, Zn, Mg and the complex $$\frac{Li^I + Fe^{III}}{2}$$

T is at least one trivalent metal ion selected from the group consisting of Al and Cr, and wherein $x$ is not greater than ⅔, $y$ is between ¼ and 1, and $z$ is not greater than ⅕, these crystals having a unit cell which in the hexagonal crystal system has a $c$-axis of about 32.8 A. and an $a$-axis of about 5.9 A.

3. A method of producing a ferromagnetic material comprising the steps of preparing a finely-divided mixture of oxides in proportions forming upon heating crystals having a composition $$Q_{(1-x)}Ca_xFe^{II}_{2(1-y)}R_{2y}Fe^{III}_{16(1-z)}T_{16z}O_{27}$$

wherein Q is at least one divalent metal ion selected from the group consisting of Ba, Sr and Pb, R is at least one divalent metal ion selected from the group consisting of Mg, Co, Ni, Zn, Mn and the complex $$\frac{Li^I + Fe^{III}}{2}$$

T is at least one trivalent metal ion selected from the group consisting of Al and Cr, and wherein $x$ is not greater than ⅔, $y$ is between ¼ and 1, and $z$ is not greater than ⅕, these crystals having a unit cell which in the hexagonal crystal system has a $c$-axis of about 32.8 A. and an $a$-axis of about 5.9 A.; and heating said mixture in an atmosphere having at least as much oxygen as air to a temperature of at least 1100° C. to about 1370° C. to form said crystals, said material having an initial permeability ($\mu_0$) exceeding 2 at a frequency of at least 50 mc./sec.

4. A method of producing a ferromagnetic material comprising the steps; preparing a finely-divided mixture of oxides forming upon heating crystals having a crystal structure corresponding to the mineral magnetoplumbite and consisting of an iron-containing reaction product; heating said mixture to a temperature not greater than 1100° C. to form said reaction product; preparing a finely-divided mixture of said reaction product and oxides in proportions forming crystals having a composition $$Q_{(1-x)}Ca_xFe^{II}_{2(1-x)}R_{2y}Fe^{III}_{16(1-z)}T_{16z}O_{27}$$

wherein Q is at least one divalent metal ion selected from the group consisting of Ba, Sr and Pb, R is at least one divalent metal ion selected from the group consisting of Mn, Co, Ni, Zn, Mg and the complex $$\frac{Li^I + Fe^{III}}{2}$$

T is at least one trivalent metal ion selected from the group consisting of Al and Cr, and wherein $x$ is not greater than ⅔, $y$ is between ¼ and 1, and $z$ is not greater than ⅕, these crystals having a unit cell which in the hexagonal crystal system has a c-axis of about 32.8 A. and an a-axis of about 5.9 A.; and heating said latter mixture in an atmosphere having at least as much oxygen as air to a temperature of at least 1100° C. to about 1370° C. to form said latter crystals having an initial permeability ($\mu_0$) greater than 2 at frequencies of at least 50 mc./sec.

5. A method of producing a ferromagnetic material comprising the steps, preparing a finely-divided mixture of oxides in proportions forming upon heating crystals of a compound having the composition $$Q_{(1-x)}Ca_xFe^{II}_{2(1-y)}R_{2y}Fe^{III}_{16(1-z)}T_{16z}O_{27}$$

wherein Q is at least one divalent metal ion selected from the group consisting of Ba, Sr and Pb, R is at least one divalent metal ion selected from the group consisting of Mn, Co, Ni, Zn, Mg and the complex $$\frac{Li^I + Fe^{III}}{2}$$

T is at least one trivalent metal ion selected from the group consisting of Al and Cr, and wherein $x$ is not greater than $\frac{2}{3}$, $y$ is between $\frac{1}{4}$ and 1, and $z$ is not greater than $\frac{1}{3}$, these crystals having a unit cell which in the hexagonal crystal system has a c-axis of about 32.8 A. and an a-axis of about 5.9 A.; heating said mixture to about 900° C. to about 1200° C. to form a reaction product; finely-dividing said reaction product; and heating said finely-divided reaction product in an atmosphere having at least as much oxygen as air to a temperature of at least 1100° C. to about 1370° C. to form said crystals having an initial permeability ($\mu_0$) of at least 2 at frequencies of at least 50 mc./sec.

6. A method of producing a ferromagnetic material comprising the steps, preparing a finely-divided mixture of oxides in proportions forming upon heating crystals having the composition $$Q_{(1-x)}Ca_xFe^{II}_{2(1-y)}R_{2y}Fe^{III}_{16(1-z)}T_{16z}O_{27}$$

wherein Q is at least one divalent metal ion selected from the group consisting of Ba, Sr and Pb, R is at least one divalent metal ion selected from the group consisting of Mn, Co, Ni, Zn, Mg and the complex $$\frac{Li^I + Fe^{III}}{2}$$

T is at least one trivalent metal ion selected from the group consisting of Al and Cr, and wherein $x$ is not greater than $\frac{2}{3}$, $y$ is between $\frac{1}{4}$ and 1, and $z$ is not greater than $\frac{1}{3}$, these crystals having a unit cell which in the hexagonal crystal system has a c-axis of about 32.8 A. and an a-axis of about 5.9 A.; and heating said mixture in an atmosphere having at least as much oxygen as air to a temperature of 1300° C. to 1370° C. in about 30 minutes to form said crystals having an initial permeability of at least 2 at a frequency of at least 50 mc./sec.

7. A method of producing a ferromagnetic body having an initial permeability exceeding about 2 at frequencies of at least 50 mc./sec. comprising the steps, preparing a finely-divided mixture of oxides in proportions producing upon heating crystals having the composition $$Q_{(1-x)}Ca_xFe^{II}_{2(1-y)}R_{2y}Fe^{III}_{16(1-z)}T_{16z}O_{27}$$

wherein Q is at least one divalent metal ion selected from the group consisting of Ba, Sr and Pb, R is at least one divalent metal ion selected from the group consisting of Mn, Co, Ni, Zn, Mg and the complex $$\frac{Li^I + Fe^{III}}{2}$$

T is at least one trivalent metal ion selected from the group consisting of Al and Cr, and wherein $x$ is not greater than $\frac{2}{3}$, $y$ is between $\frac{1}{4}$ and 1, and $z$ is not greater than $\frac{1}{3}$, these crystals having a unit cell which in the hexagonal crystal system has a c-axis of about 32.8 A. and an a-axis of about 5.9 A.; compacting said mixture into a body of desired shape and dimensions; and heating said body in an atmosphere having at least as much oxygen as air to a temperature of at least 1100° C. to about 1370° C. to form a highly-coherent body of said crystals.

8. A ferromagnetic material consisting essentially of crystals having a composition:

$$QFe^{II}_{2(1-y)}R_{2y}Fe^{III}_{16(1-z)}T_{16z}O_{27}$$

wherein Q is at least one divalent metal ion selected from the group consisting of Ba, Sr, and Pb, R is at least one divalent metal ion selected from the group consisting of Mn, Co, Ni, Zn, Mg, and the complex $$\frac{Li^I + Fe^{III}}{2}$$

T is a metal selected from the group consisting of Al and Cr, and wherein $y$ is between $\frac{1}{4}$ and 1, and $z$ is less than $\frac{1}{3}$, said crystals having a unit cell which in the hexagonal system has a c-axis of about 32.8 A. and an a-axis of about 5.9 A.

9. A ferromagnetic material consisting essentially of crystals having a composition $$Ba_xSr_{(1-x)}Fe^{II}_{2(1-y-p)}Co_{2p}Ni_{2y}Fe^{III}_{16}O_{27}$$

in which $p$ is between $\frac{1}{3}$ and $\frac{2}{3}$, $y$ is not greater than $\frac{2}{3}$, and $(p+y)$ is not greater than 1, and $x$ has a value not greater than 1, said crystals having a unit cell which, in the hexagonal crystal system, has a c-axis of about 32.8 A. and an a-axis of about 5.9 A.

10. A ferromagnetic material consisting essentially of crystals having the composition $$Ba_xSr_{(1-x)}Fe^{II}_{2(1-y-p)}Co_{2p}Zn_{2y}Fe^{III}_{16}O_{27}$$

in which $p$ is between $\frac{1}{3}$ and $\frac{2}{3}$, $y$ is not greater than $\frac{2}{3}$, $(p+y)$ is not greater than 1, and $x$ is not greater than 1, said crystals having a unit cell which, in the hexagonal crystal system, has a c-axis of about 32.8 A. and an a-axis of about 5.9 A.

References Cited in the file of this patent

UNITED STATES PATENTS

| | | |
|---|---|---|
| 2,659,698 | Berge | Nov. 17, 1953 |
| 2,723,239 | Harvey | Nov. 8, 1955 |
| 2,736,708 | Crowley | Feb. 28, 1956 |
| 2,762,777 | Went | Sept. 11, 1956 |
| 2,762,778 | Gorter et al. | Sept. 11, 1956 |
| 2,778,803 | Crowley | Jan. 22, 1957 |
| 2,828,264 | Medvedieff | Mar. 25, 1958 |

FOREIGN PATENTS

| | | |
|---|---|---|
| 1,100,865 | France | Apr. 13, 1955 |
| 927,259 | Germany | May 2, 1955 |
| 165,447 | Australia | Oct. 4, 1955 |

OTHER REFERENCES

Erchalk et al.: J. Amer. Chem. Soc., Oct. 1946, pp. 2085–2093.

Harvey et al.: RCA Review, Sept. 1, 1950, p. 346.

"Phillips Technical Review," vol. 13, No. 7, pp. 194–208.

"Phillips Technical Review," vol. 18, pp. 145–154, No. 6.

UNITED STATES PATENT OFFICE
CERTIFICATION OF CORRECTION

Patent No. 2,955,085                         October 4, 1960

Gerard Heinrich Jonker et al.

It is hereby certified that error appears in the above numbered patent requiring correction and that the said Letters Patent should read as corrected below.

Column 8, line 63, the composition should read as shown below instead of as in the patent:

$$Q_{(1-x)}Ca_xFe^{II}_{2(1-y)}R_{2y}Fe^{III}_{16(1-z)}T_{16z}O_{27}$$

Signed and sealed this 18th day of July 1961.

(SEAL)
Attest:

ERNEST W. SWIDER                         DAVID L. LADD
Attesting Officer                          Commissioner of Patents